United States Patent [19]
Nishizawa

[11] Patent Number: 5,108,716
[45] Date of Patent: Apr. 28, 1992

[54] CATALYTIC CONVERTER

[75] Inventor: Kimiyoshi Nishizawa, Yokohama, Japan

[73] Assignee: Nissan Motor Company, Inc., Yokohama, Japan

[21] Appl. No.: 618,023

[22] Filed: Nov. 27, 1990

Related U.S. Application Data

[63] Continuation of Ser. No. 492,378, Mar. 12, 1990, abandoned, which is a continuation of Ser. No. 206,795, Jun. 15, 1988, abandoned.

[30] Foreign Application Priority Data

Jun. 30, 1987 [JP] Japan .................. 62-161065

[51] Int. Cl.⁵ .................. B01D 53/36; F01N 3/28
[52] U.S. Cl. .................. 422/171; 422/177; 422/180; 422/190; 422/211; 422/222; 55/482; 55/524; 55/DIG. 30; 60/299; 60/301
[58] Field of Search .......... 422/171, 177, 180, 190, 422/211, 222; 55/482, 524, DIG. 30; 60/299, 301

[56] References Cited

U.S. PATENT DOCUMENTS

| | | | |
|---|---|---|---|
| 4,072,471 | 2/1978 | Morgan, Jr. et al. | 422/171 |
| 4,134,733 | 1/1979 | Völker et al. | 422/177 |
| 4,388,275 | 6/1983 | Fratzer et al. | 422/180 |

Primary Examiner—Lynn Kummert
Attorney, Agent, or Firm—Pennie & Edmonds

[57] ABSTRACT

A catalytic converter for purification of exhaust gas discharged from an automotive internal combustion engine. The catalytic converter is comprised of first and second three-way catalysts disposed in a casing. The first catalyst is located upstream of the second catalyst relative to the stream of exhaust gas in the catalytic converter. Each catalyst is formed therein with many exhaust gas passages through which exhaust gas passes. Each catalyst includes a honeycomb type monolithic ceramic substrate having many cells each defined by walls in the substrate. At least a part of each cell serves as the exhaust gas passage. A wash coating is formed on the surface of the walls in the substrate and contains cerium. Catalytic noble metals are carried by the wash coating. The amount of the catalytic noble metals, per a unit volume of the catalyst, carried by the wash coating in the first catalyst is more than that in the second catalyst, thereby improving activation promoting characteristics of the first catalyst at low temperatures.

3 Claims, 5 Drawing Sheets

CATALYTIC CONVERTER

This is a continuation of application Ser. No. 07/492,378, filed Mar. 12, 1990, now abandoned, which is a continuation of application Ser. No. 07/206,795, filed June 15, 1988, now abandoned.

BACKGROUND OF THE INVENTION

1. Field of the Invention

This invention relates to improvements in a catalytic converter for purification of exhaust gas from an automotive engine, and more particularly to such a catalytic converter to promote exhaust gas purification performance at low temperatures or at engine starting.

2. Description of the Prior Art

Catalytic converters having a honeycomb type monolithic catalyst have been proposed as disclosed in Japanese Utility Model Provisional Publication No. 57-44921 and extensively used in automotive vehicles. One of such a conventional catalytic converter will be briefly discussed with reference to FIGS. 7 and 8. The catalytic converter in FIG. 7 includes a single honeycomb type three-way catalyst 3 which is disposed inside a metallic casing 1 through a mat 2 formed of ceramic fiber. The casing 1 is constituted of upper and lower counterparts and has exhaust gas inlet and output openings 1A, 1B. The honeycomb type three-way catalyst 3 includes a honeycomb grid type ceramic substrate in which many axially extending cells are formed. Each cell is defined by ceramic walls. The walls of the substrate are coated with so-called wash coating which is formed of alumina and contains cerium, lanthanum and/or the like. Additionally, catalytic noble metals such as platinum (Pt), rhodium (Rh) and/or palladium (Pd) are carried by the wash coating to accomplish catalytic action for noxious components such as nitrogen oxides (NOx), carbon monoxide (CO) and hydrocarbons contained in exhaust gas.

Now a temperature of about 300° C. is necessary to activate such a catalyst so that the catalyst exhibits a sufficient exhaust gas purification performance. Accordingly, a considerable time is required to attain such a temperature particularly at engine start-up in which the catalyst is at a low temperature. Since exothermic reaction of exhaust gas occurs in the catalyst, temperature distribution within the catalyst is as shown in FIG. 8 in which temperature is higher in the central and outlet sections than in the inlet section of the catalyst. In general, the central and outlet sections of the catalyst are 50° to 100° C. higher than in the inlet section. As a result, it is required to raise the warm-up characteristics of the inlet side of the catalyst.

In order to raise the warm-up characteristics of the catalyst inlet section, it is considered to increase the amount of the catalytic metals, to reduce the amount of the wash coating, to reduce the amount of cerium in the wash coating, and/or to minimize the density of cells (i.e., the number of exhaust gas passages per a unit area).

However, in the conventional catalytic converter using a single catalyst, there becomes too much catalytic metal over a necessary amount in the central and outlet sides of the catalyst in the above-mentioned measure to increase the amount of the catalytic metals, thereby raising cost of the catalytic converter. According to the above-mentioned measures to reduce the amount of the wash coating and the like and/or cell density, there arise problems of deterioration of the catalyst at high temperatures and of lowering in exhaust gas purification performance.

In addition, other measures to improve the warm-up characteristics of the catalyst inlet section have been proposed as disclosed in Japanese Utility Model Publication No. 56-50716, Japanese Utility Model Publication No. 58-47207, Japanese Patent Provisional Publication No. 55-164715, Japanese Patent Provisional Publication No. 48-9975, and Japanese Patent Provisional Publication No. 49-41722.

A catalytic converter disclosed in Japanese Utility Model Publication No. 56-50716 includes two (upstream and downstream side) catalysts in which the upstream side catalyst is higher in the cell density than the downstream side catalyst. This leads to increasing the heat capacity of the upstream side catalyst thereby degrading the warm-up characteristics of the upstream side catalyst, which is apparent under the present state of the art technique in which a substrate or carrier of the catalyst is high in strength so that the thickness of walls of the cells can be made constant regardless of the cell density. Catalytic converters disclosed in the other publications also have two (upstream and downstream side) catalysts which differ from each other in the kind of catalyst and have different functions. Accordingly, complicated control is required to cause them to exhibit the respective functions. In case base metal is used for the catalytic metal of the catalyst, the catalyst is degraded in low temperature activity and purification performance for nitrogen oxides (NOx) and paraffin hydrocarbons at high temperatures, as compared with noble metals.

SUMMARY OF THE INVENTION

It is an object of the present invention to provide an improved catalytic converter which is low in production cost while maintaining a high exhaust gas purification performance.

Another object of the present invention is to provide an improved catalytic converter having two catalysts in which the upstream catalyst is so constructed as to be excellent in warm-up or activation promoting characteristics.

According to the present invention, the catalytic converter for purification of exhaust gas is comprised of a plurality of catalysts disposed in a casing and including first and second catalysts. The first catalyst is disposed upstream of the second catalyst relative to the stream of exhaust gas. Each catalyst has formed therein a plurality of exhaust gas passages through which exhaust gas passes. The exhaust gas passages in the first catalyst are in communication with those in the second catalyst. Each catalyst includes a honeycomb type monolithic substrate having a plurality of cells each defined by walls in the substrate. At least a part of each cell serves as the exhaust gas passage. A wash coating containing cerium is formed on the surface of the walls. At least one catalytic noble metal is carried by the wash coating. Additionally, the first and second catalysts meet at least one of the following conditions: (1) the amount of the catalytic noble metal, per a unit volume of the catalyst, carried by the wash coating in the first catalyst is more than that in the second catalyst; (2) The amount of the wash coating, per a unit volume of the catalyst, in the first catalyst is less than that in the second catalyst; (3) The amount of cerium contained in the wash coating in the first catalyst is less than that in the second catalyst; and (4) The cell density in the substrate in the first catalyst is less than that in the second catalyst.

Thus, according to the present invention, the upstream side first catalyst is so configured as to be suitable at low temperatures thereby to raise its activation promoting or warm-up characteristics, whereas the downstream side second catalyst is so configured as to be suitable at high temperatures thereby to maintain high exhaust gas purification performance at high temperatures. Additionally, the amount of the expensive noble metal can be reduced, thereby achieving a large cost reduction.

DETAILED DESCRIPTION OF THE INVENTION

Figure 1:
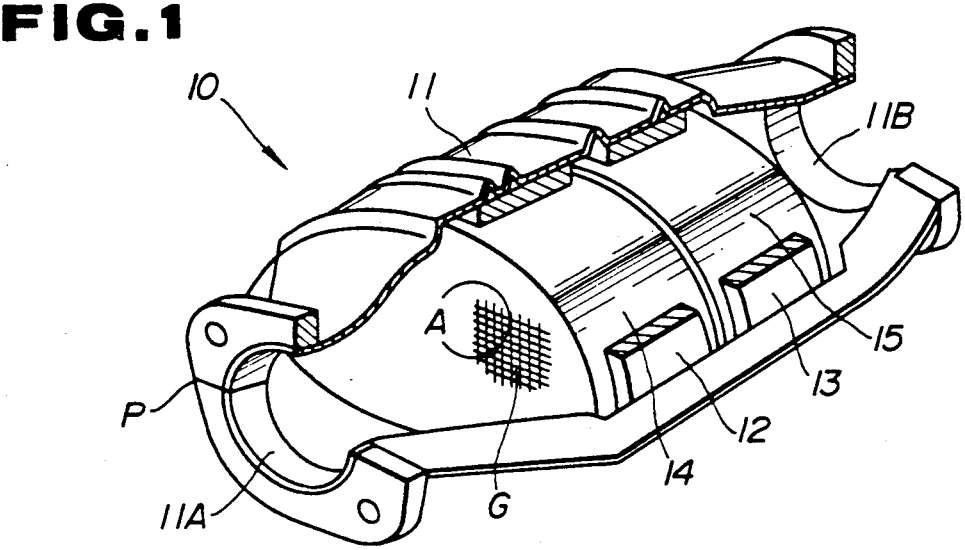
FIG. 1 is a perspective view, partly in section, of a first embodiment of a catalytic converter in accordance with the present invention.

Referring now to FIG. 1, a first embodiment of a catalytic converter in accordance with the present invention is illustrated by the reference numeral 10. The catalytic converter in this embodiment is mounted on an automotive vehicle (not shown) to purify exhaust gas from an internal combustion engine (not shown) mounted on the vehicle. The catalytic converter 10 is incorporated in an exhaust system (not shown) of the engine and composed of a generally cylindrical metallic casing 11 which has inlet and outlet openings 11A, 11B, so that exhaust gas from the engine is fed through the inlet opening 11A into the catalytic converter 10 and discharged through the outlet opening 11B from the catalytic converter 10. The casing 11 includes upper and lower counterparts which are fixedly secured with each other to form a parting face P therebetween.

First and second honeycomb type three-way catalysts 14, 15 are fixedly disposed inside the casing 11 in such a manner that their axes are aligned with each other. The three-way catalysts 14, 15 function to convert noxious nitrogen oxides (NOx), carbon monoxide (CO) and hydrocarbons contained in exhaust gas into harmless gases. A first cylindrical ceramic fiber mat 12 is disposed between the casing 11 and the first catalyst 14 in such a manner that the outer peripheral surface of the first catalyst 14 is in tight contact with the inner surface of the mat 12. A second cylindrical ceramic fiber mat 13 is disposed between the casing 11 and the second catalyst 15 in such a manner that the outer peripheral surface of the second catalyst 15 is in tight contact with the inner surface of the mat 13. Additionally, the first catalyst 14 is located upstream of the second catalyst 15 relative to flow of exhaust gas passing through the catalytic converter 10. Each catalyst 14, 15 is formed with many axially extending exhaust passages G through which exhaust gas to be purified passes. The exhaust passages G of the first catalyst 14 are in communication with the exhaust passages G of the second catalyst 15 so that exhaust gas subjected to catalytic action of the first catalyst 14 is subsequently subjected to catalytic action of the second catalyst 15.

Figure 2:
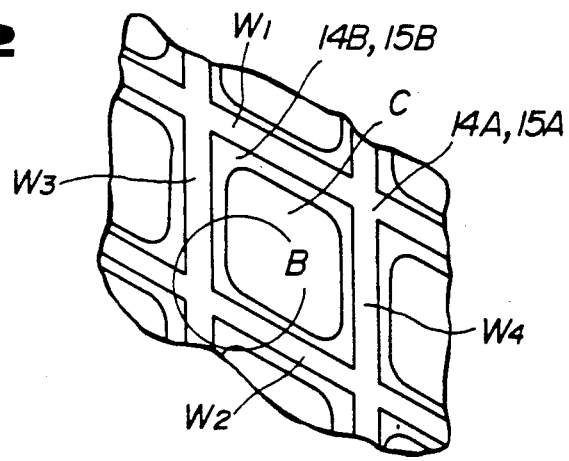
FIG. 2 is an enlarged view of a part encircled by a circle A in FIG. 1.
Figure 3:
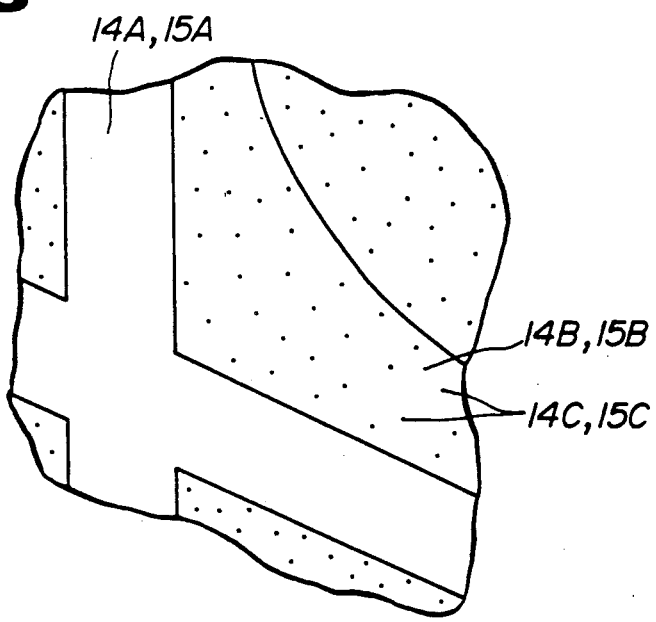
FIG. 3 is a further enlarged view of a part encircled by a circle B in FIG. 2.

As shown in FIG. 2, each of the first and second catalysts 14, 15 includes a honeycomb type monolithic substrate or carrier 14A, 15A formed of ceramic. In this embodiment, each of the substrates 14A, 14B is grid-shaped in cross-section and therefore formed with many axially extending cells C each having a rectangular cross-section. Each cell C is defined by upper and lower flat walls $W_1$, $W_2$ and opposite side flat walls $W_3$, $W_4$. The upper and lower flat walls $W_1$, $W_2$ face each other and are parallel to each other. The side flat walls $W_3$, $W_4$ face each other and are parallel to each other. The walls $W_1$, $W_2$, $W_3$, $W_4$ have generally the same thickness.

A wash coating 14B, 15B is formed on the surface of the grid walls $W_1$, $W_2$, $W_3$, $W_4$ in the first and second substrate 14A, 15A. The wash coating 14B, 15B includes alumina as the main component and contains cerium and/or the like. The wash coating 14B, 15B carries catalytic noble metal 14C, 15C such as platinum (Pt) and/or rhodium (Rh) which exhibits catalytic action. The thus formed wash coating 14B, 15B on the grid walls $W_1$, $W_2$, $W_3$, $W_4$ defines thereinside an axially extending space corresponding to the above-mentioned exhaust gas passage G shown in FIG. 1.

More specifically, in the first catalyst 14, the amount of the catalytic noble metals (Pt and Rh) carried or supported on the wash coating 14B is 50 g/cf in which the weight ratio of Pt/Rh is 10/1. In the second catalyst 15, the amount of the catalytic metals (Pt and Rh) is 30 g/cf in which the ratio of Pt/Rh is 10/1. Thus, the amount of the catalytic metals is larger in the first catalyst 14 than in the second catalyst 15. Specifically, the weight ratio of the total amount of platinum and rhodium in the first catalyst to that in the second catalyst is 5:3. Additionally, in the first catalyst 14, the volume of the catalyst is 0.8 liter; the density of the cells C is 400 cells/in$^2$; and the amount of the wash coating is 140 g/l. The density of the cells C is measured in a cross-section (of the substrate 14A, 15A) to which an axis of the substrate is perpendicular. The second catalyst 15 has the same catalyst volume, cell density and wash coating amount as the first catalyst 14.

Figure 4:
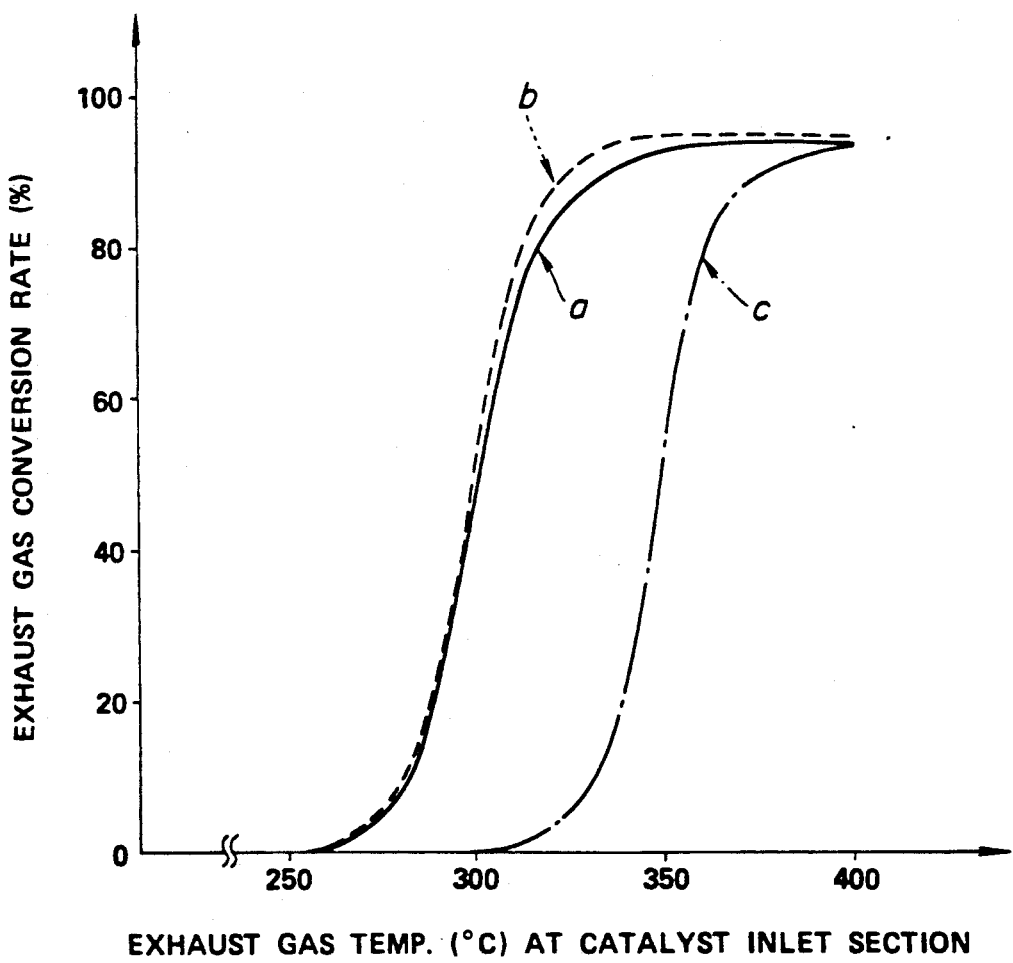
FIG. 4 is a graph showing the variation of exhaust gas conversion rate upon variation of amount of catalytic noble metals in a catalyst.

Performance of the first embodiment catalytic converter 10 will be compared with those of conventional catalytic converters with reference to the graph of FIG. 4.

Figure 7:
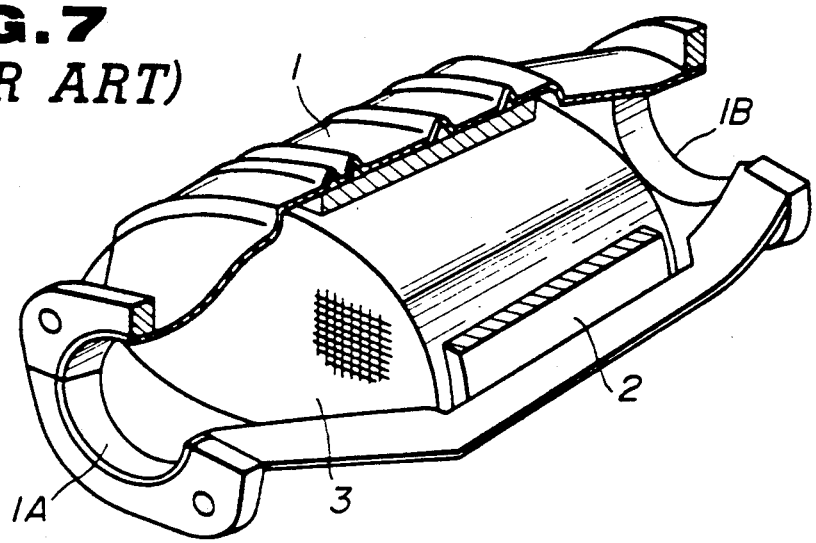
FIG. 7 is a perspective view similar to that in FIG. 1 but showing a conventional catalytic converter.
Figure 8:
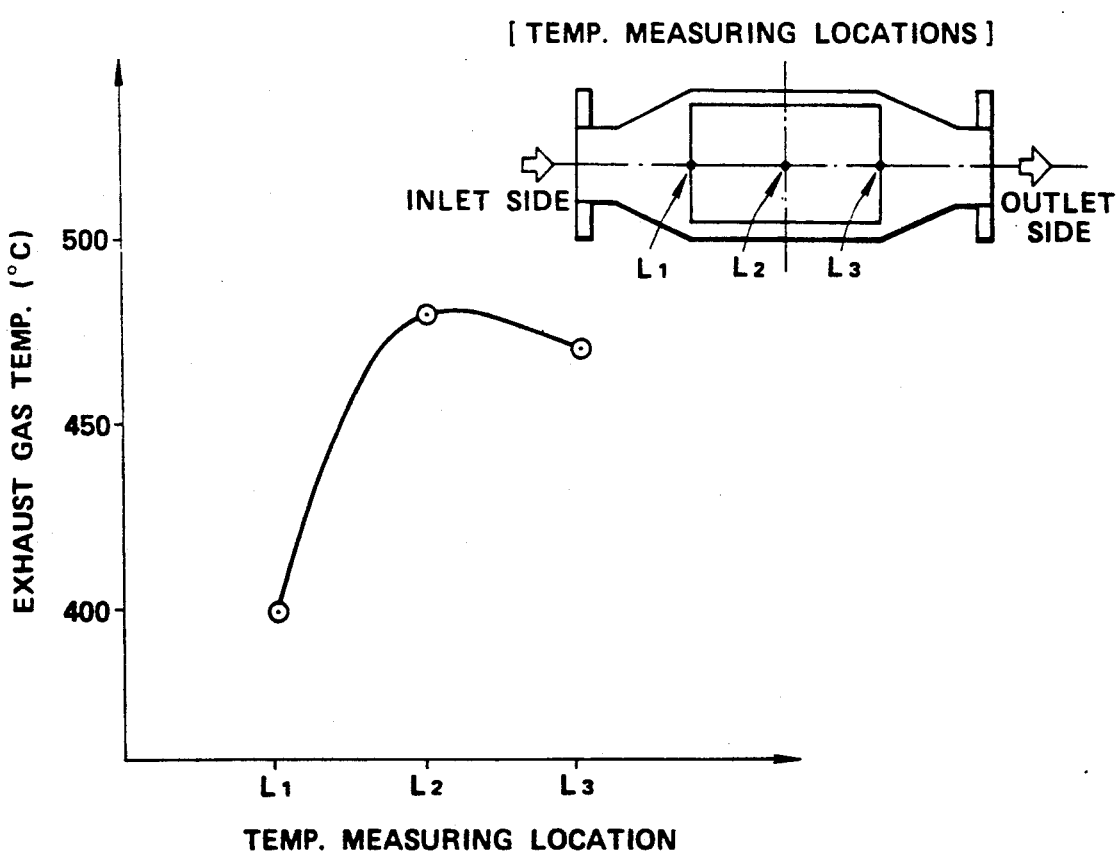
FIG. 8 is a graph showing a temperature distribution in the conventional catalytic converter of FIG. 1.

In FIG. 4, a solid line a indicates the performance of the first embodiment catalytic converter 10 as shown in FIG. 1. A broken line b indicates a conventional catalytic converter (of the type shown in FIG. 7) having a volume of catalyst of 1.6 liters and an amount of catalytic noble metals (Pt and Rh) of 50 g/cf in which the ratio of Pt/Rh is 10/1. A dash-dot line c indicates another conventional catalytic converter (of the type shown in FIG. 7) having a volume of catalyst of 1.6 liters and an amount of catalytic noble metals (Pt and Rh) of 30 g/cf in which the ratio of Pt/Rh is 10/1.

The lines b and c demonstrate that exhaust gas purification performance represented by exhaust gas conversion rate (the rate of conversion of noxious exhaust gas components into harmless gases) at high temperatures is nearly the same as in the former conventional case having a larger amount of the catalytic noble metals and in the latter conventional case having a smaller amount of the catalytic noble metals; however, the activation promoting characteristics at low temperatures is excellent in the former conventional case having a larger amount of the catalytic metals as compared with the latter conventional case. It is to be noted that exhaust gas temperature in FIG. 4 was measured at a catalyst inlet section (not identified) through which exhaust gas enters the catalyst.

Additionally, the graph of FIG. 4 depicts that the first embodiment catalytic converter exhibits the nearly same activation promoting characteristics at low temperatures and exhaust gas purification performance at high temperatures as in teh former conventional case, although the carried amount of the catalytic noble metals of the first embodiment catalytic converter is smaller by about 20 wt % than the former conventional case of the dotted line b. In this connection, the first embodiment catalytic converter includes the first catalyst having the carried amount of the catalytic metals (Pt and Rh) of 50 g/cf and the second catalyst having the carried amount of the catalytic metals (Pt and Rh) of 30 g/cf. The total volume of the first and second catalysts in the first embodiment catalytic converter is the same as the volume of the catalyst in the former conventional case of the broken line b.

This demonstrates that the first embodiment catalytic converter having two kinds of catalysts exhibits good activation promoting or warm-up characteristics at low temperatures, with less catalytic metals as compared with the conventional catalytic converters having a single catalyst.

Figure 5:
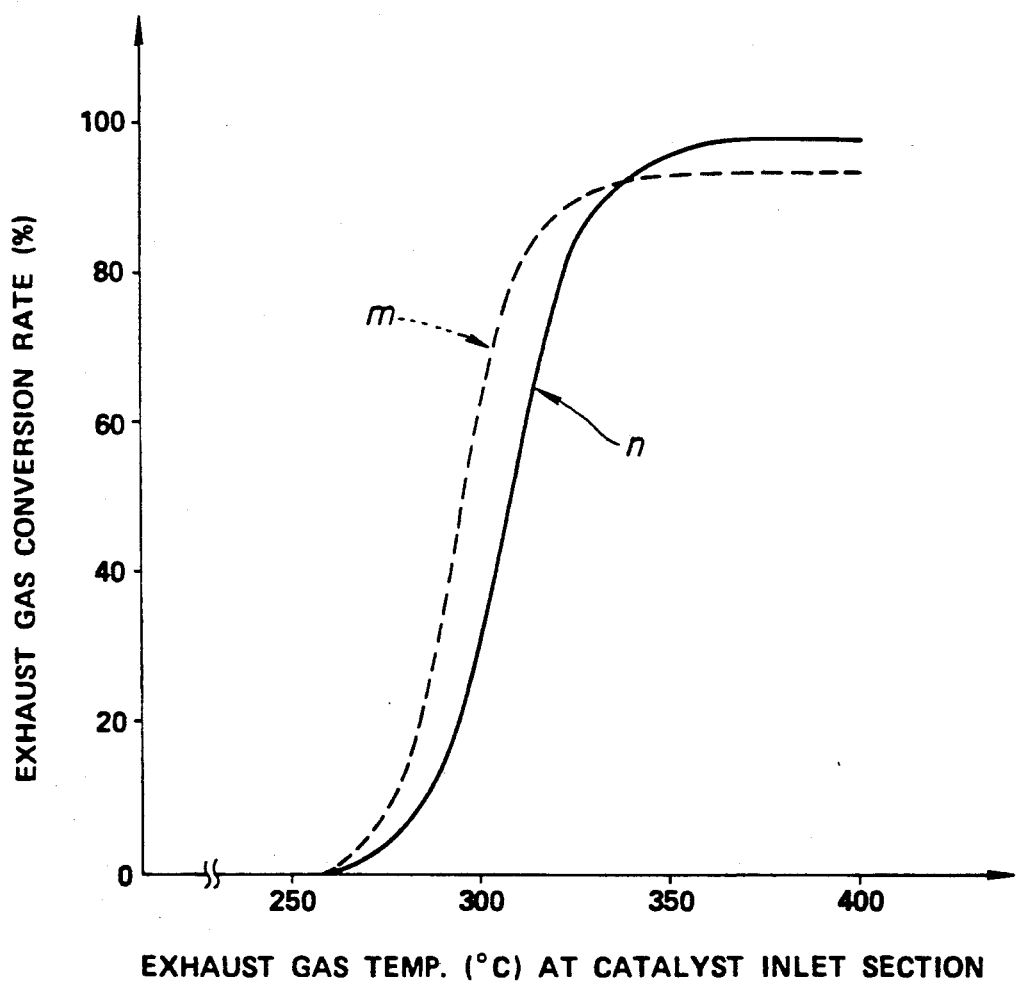
FIG. 5 is a graph showing the variation of exhaust gas conversion rate upon variation of amount of a wash coating.

FIG. 5 depicts experimental data for comparison between two conventional catalytic converters (of the type shown in FIG. 7) which are the same in catalyst volume and carried amount of catalytic metals but different in amount of a wash coating. In FIG. 5, a broken line m indicates a case having an amount of the wash coating of 120 g/l, while a solid line n indicates a case having an amount of the wash coating of 200 g/l.

The graph of FIG. 5 demonstrates that the case having a smaller wash coating amount is excellent in activation promoting characteristics from a low temperature condition because of a smaller heat capacity but becomes excessive in thermal deterioration because of degradation in dispersion of catalytic metals thereby to degrade the characteristics at high temperatures. Accordingly, it will be understood that a three-way catalyst having a smaller wash coating amount is suitable for an upstream side catalyst (corresponding to that 14 in FIG. 1) which requires activation promoting characteristics from a low temperature range, while a three-way catalyst having a larger wash coating amount is suitable for a downstream side catalyst (corresponding to that 15 in FIG. 1).

In view of this, a second embodiment of the catalytic converter according to the present invention is provided to have the same configuration as in the first embodiment except for the amount of the wash coating 14B, 15B. Accordingly, the figure of the second embodiment catalytic converter is omitted by denoting the same elements and parts as in the first embodiment with the same reference numerals. More specifically, the second embodiment catalytic converter includes the first three-way catalyst 14 having a catalyst volume of 0.8 liter, a catalytic metals (Pt and Rh) amount of 50 g/cf (Pt/R=10/1) and a wash coating amount of 120 g/l, and the second three-way catalyst 15 having a catalyst volume of 0.8 liter, a catalytic metals (Pt and Rh) amount of 30 g/cf (Pt/Rh=10/1) and a wash coating amount of 200 g/l. Accordingly, the weight ratio between the wash coating in the catalyst and the wash coating in the second catalyst, per a unit volume of the catalyst, is 3:5. It is to be noted that the content of cerium per a unit volume of the wash coating 14B, 15B is the same in the first and second catalysts 14, 15, and therefore the total amount of cerium is larger in the second catalyst 15 than in the first catalyst 14.

Figure 6:
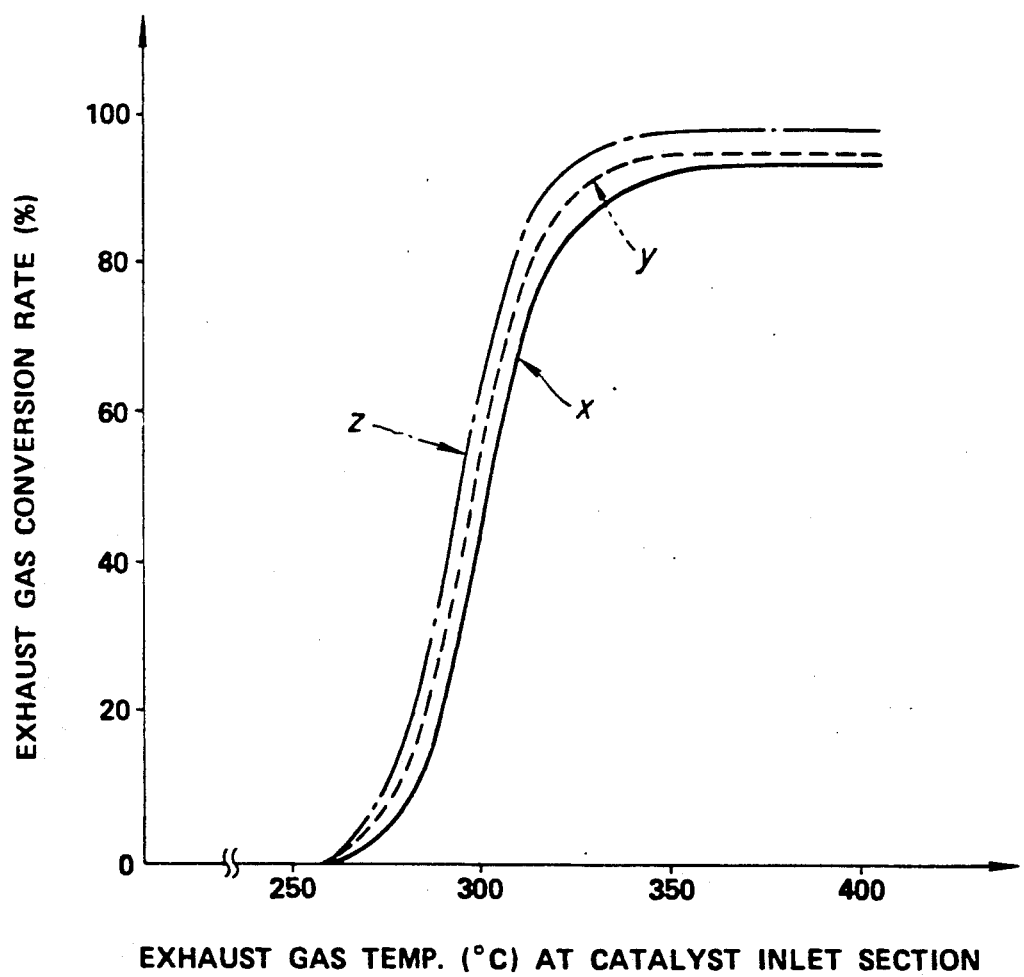
FIG. 6 is a graph showing the variation of exhaust gas conversion rate of the first embodiment and second and third embodiments in accordance with the present invention.

In this regard, reference is made to the graph of FIG. 6 in which a solid line x indicates the data of the first embodiment catalytic converter, and a broken line y the second embodiment catalytic converter. This graph demonstrates that the second embodiment catalytic converter is improved both in low temperature activation promoting characteristics and high temperature activation characteristics over the first embodiment catalytic converter.

Next, a third embodiment of the catalytic converter according to the present invention is provided to have the same configuration as the first embodiment catalytic converter except for the cell density of the substrates 14A, 15A of the first and second three-way catalysts 14, 15. Accordingly, the figure of the third embodiment catalytic converter is omitted by denoting the same elements and parts as in the first embodiment with the same reference numerals. More specifically, the first and second catalysts 14, 15 of this embodiment are the same in catalyst volume, catalytic metal carried amount and wash coating amount as those in the first embodiment. However, the substrates 14A, 15A of the first and second catalysts of this embodiment have a cell density of 300 cells/in$^2$ and that of 600 cells/in$^2$, respectively. Accordingly, the ratio of cell density between the substrate in the first catalyst and the substrate in the second catalyst is 1:2.

In case the cell density is made smaller thereby to decrease the number of exhaust gas passage G per a unit volume, the heat capacity of the catalyst lowers on the assumption that the thickness of the grid walls $W_1$, $W_2$, $W_3$, $W_4$ is constant thereby to improve the activation promoting characteristics a low temperatures. However, the exhaust gas purification performance at high temperatures deteriorates because the surface area of the grid walls decreases. Accordingly, one having a smaller cell density is suitable for the first (upstream side) catalyst 14 requiring the low temperature activation characteristics, while one having a larger cell density is suitable for the second (downstream side) catalyst 15 requiring the high temperature activation characteristics. In this regard, as shown in FIG. 6 in which a dot-dash line z indicates experimental data of the third embodiment catalytic converter, the third embodiment catalytic converter is improved both in the activation promoting or warm-up characteristics at low temperatures and the exhaust gas purification performance over the first embodiment catalytic converter.

What is claimed is:

1. A catalytic converter for purification of exhaust gas, comprising:

a plurality of three-way catalysts disposed in a casing having an exhaust gas inlet and outlet and including a first and a second catalyst, said first catalyst being disposed upstream of said second catalyst relative to exhaust gas flow from said exhaust gas inlet to said outlet, each catalyst having therein a plurality of exhaust gas passages through which exhaust gas passes, said exhaust gas passages in said first catalyst being in gaseous communication with those in said second catalyst, each catalyst including a honeycomb type monolithic substrate having a plurality of cells each defined by walls in said substrate, at least a part of each cell serving as one of said exhaust gas passages, a wash coating formed on a surface of said walls and containing cerium, at least one catalytic noble metal selected from the group consisting of platinum and rhodium carried by said wash coating, sand wherein the amount of said catalytic noble metal, per a unit volume of said catalyst, carried by said wash coating in said first catalyst as compared to said second catalyst is of a weight ratio of 5:3.

2. A catalytic converter for purification of exhaust gas, comprising:

a plurality of three-way catalysts disposed in a casing having an exhaust gas inlet and outlet and including a first and a second catalyst, said first catalyst being disposed upstream of said second catalyst relative to exhaust gas flow from said exhaust gas inlet to said outlet, each catalyst having therein a plurality of exhaust gas passages through which exhaust gas passes, said exhaust gas passages in said first catalyst being in gaseous communication with those in said second catalyst, each catalyst including a honeycomb type monolithic substrate having a plurality of cells each defined by walls in said substrate, at least a part of each cell serving as one of said exhaust gas passages, a wash coating formed on a surface of said walls and containing cerium, at least one catalytic noble metal carried by said wash coating, and wherein the amount of said wash coating, per a unit volume of said catalyst, in said first catalyst as compared to said second catalyst is of a weight ratio of 3:5.

3. A catalytic converter for purification of exhaust gas, comprising:

a plurality of three-way catalysts disposed in a casing having an exhaust gas inlet and outlet and including a first and a second catalyst, said first catalyst being disposed upstream of said second catalyst relative to exhaust gas flow from said exhaust gas inlet to said outlet, each catalyst having therein a plurality of exhaust gas passages through which exhaust gas passes, said exhaust gas passages in said first catalyst being in gaseous communication with those in said second catalyst, each catalyst including a honeycomb type monolithic substrate having a plurality of cells each defined by walls in said substrate, the ratio of the density of said cells in said substrate in said first catalyst as compared to said second catalyst is 1:2, at least a part of each cell serving as one of said exhaust gas passages, a wash coating formed on a surface of said walls and containing cerium, and at least one catalytic noble metal carried by said wash coating.

* * * * *